(12) United States Patent
Vollert et al.

(10) Patent No.: US 8,870,300 B2
(45) Date of Patent: Oct. 28, 2014

(54) METHOD FOR ACTUATING A HYDRAULIC VEHICLE BRAKE SYSTEM

(75) Inventors: Herbert Vollert, Vaihingen/Enz (DE); Remy Garnier, Remseck (DE); Reinhard Weiberle, Vaihingen/Enz (DE); Timo Jahnz, Besigheim (DE); Volker Mehl, Weingarten (DE); Frank Kneip, Bruchmuhlbach-Miesau (DE); Dirk Mahnkopf, Eglosheim (DE); Jens Kolarsky, Bietigheim/Bissingen (DE); Stephan Hoenle, Farmington Hill, MI (US)

(73) Assignee: Robert Bosch GmbH, Stuttgart (DE)

( * ) Notice: Subject to any disclaimer, the term of this patent is extended or adjusted under 35 U.S.C. 154(b) by 266 days.

(21) Appl. No.: 13/391,373

(22) PCT Filed: Jun. 25, 2010

(86) PCT No.: PCT/EP2010/059050
§ 371 (c)(1),
(2), (4) Date: Jun. 29, 2012

(87) PCT Pub. No.: WO2011/020637
PCT Pub. Date: Feb. 24, 2011

(65) Prior Publication Data
US 2012/0256480 A1  Oct. 11, 2012

(30) Foreign Application Priority Data
Aug. 21, 2009  (DE) .................... 10 2009 028 770

(51) Int. Cl.
*B60T 7/12* (2006.01)
*B60T 8/48* (2006.01)
*B60T 8/32* (2006.01)
*B60T 13/74* (2006.01)
*B60T 7/04* (2006.01)

(52) U.S. Cl.
CPC ............. *B60T 8/4881* (2013.01); *B60T 8/4845* (2013.01); *B60T 8/32* (2013.01); *B60T 13/745* (2013.01); *B60T 8/3275* (2013.01); *B60T 7/042* (2013.01)
USPC .......................................... 303/113.3; 303/10

(58) Field of Classification Search
USPC ........................................ 303/10–11, 113.3
See application file for complete search history.

(56) References Cited

U.S. PATENT DOCUMENTS 6,264,287 B1 * 7/2001 Sekihara .......................... 303/10
6,364,433 B1 * 4/2002 Stemer .......................... 303/138
(Continued)

FOREIGN PATENT DOCUMENTS

| CN | 1057495 C | 10/2000 |
|---|---|---|
| DE | 40 28 290 C1 | 1/1992 |

(Continued)

OTHER PUBLICATIONS

International Search Report corresponding to PCT Application No. PCT/EP2010/059050, mailed Aug. 26, 2010 (German and English language document) (8 pages).

*Primary Examiner* — Anna Momper
(74) *Attorney, Agent, or Firm* — Maginot, Moore & Beck

(57) ABSTRACT

A method for actuating a hydraulic vehicle brake system, includes a master brake cylinder with a preferably electromechanical brake booster and a wheel slip control device. The master brake cylinder is actuated simultaneously with the brake booster, and hydraulic pumps of the wheel slip control device are driven by an electric motor. Pressure builds more quickly in the wheel brakes of the vehicle brake system for safety and assistance functions that require high pressure build-up dynamic. The method also increases the wheel brake pressure using the pressure that can be generated by actuating the master brake cylinder with the brake booster.

8 Claims, 1 Drawing Sheet

(56) References Cited

U.S. PATENT DOCUMENTS

| | | |
|---|---|---|
| 6,386,646 B1 * | 5/2002 | Hinz et al. ............... 303/11 |
| 8,562,080 B2 * | 10/2013 | Sekiguchi et al. ......... 303/12 |
| 2002/0158510 A1 | 10/2002 | Kobayashi et al. |
| 2009/0072615 A1 * | 3/2009 | Oosawa et al. ........ 303/113.1 |

FOREIGN PATENT DOCUMENTS

| | | | |
|---|---|---|---|
| DE | 100 57 557 | A1 | 12/2001 |
| DE | 103 27 553 | A1 | 1/2005 |
| JP | 10119751 | A | 5/1998 |
| JP | 10508552 | A | 8/1998 |
| JP | 2000-16277 | A | 1/2000 |
| JP | 2002-347601 | A | 12/2002 |
| WO | 96/02409 | A1 | 2/1996 |
| WO | 96/14228 | A1 | 5/1996 |
| WO | 99/07587 | A1 | 2/1999 |

* cited by examiner

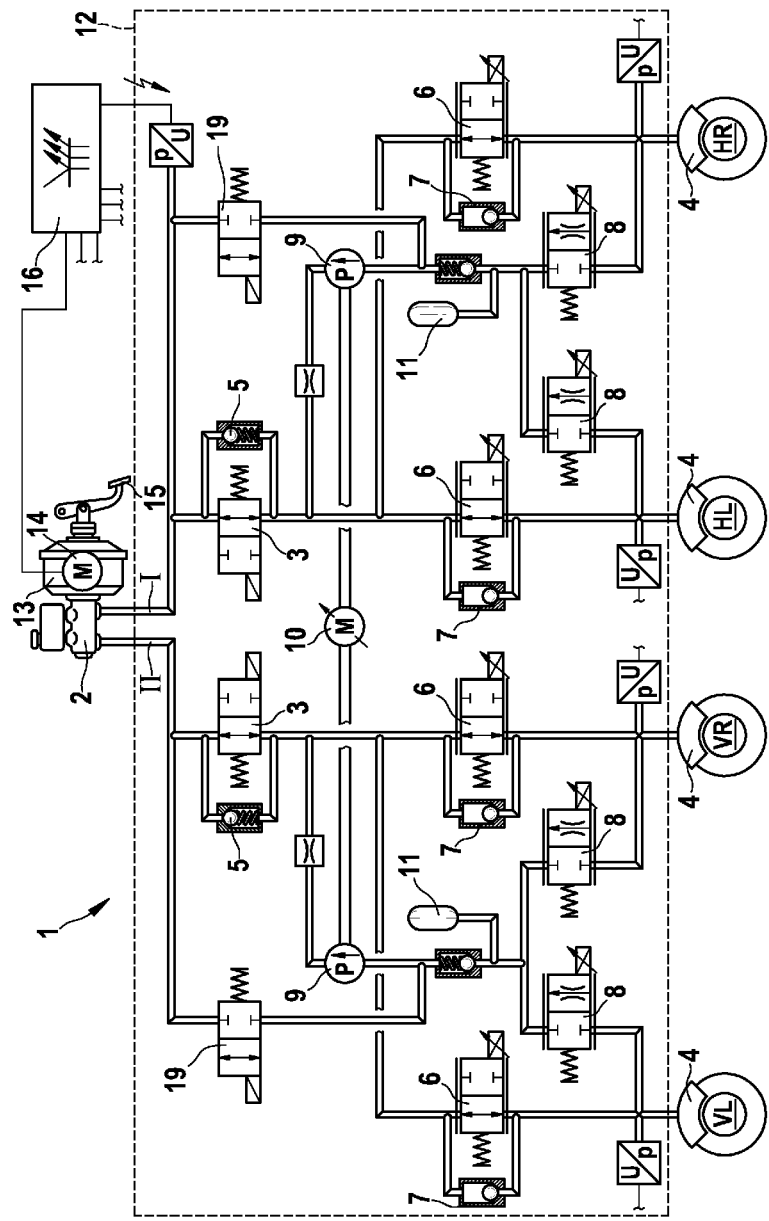

METHOD FOR ACTUATING A HYDRAULIC VEHICLE BRAKE SYSTEM

This application is a 35 U.S.C. §371 National Stage Application of PCT/EP2010/059050, filed on Jun. 25, 2010, which claims the benefit of priority to Serial No. DE 10 2009 028 770.1, filed on Aug. 21, 2009 in Germany, the disclosures of which are incorporated herein by reference in their entirety.

BACKGROUND

The disclosure relates to a method for actuating a hydraulic vehicle brake system comprising a controllable brake booster and a wheel slip control device.

German laid-open patent application DE 103 27 553 A1 discloses a hydraulic vehicle brake system with a hydraulic master brake cylinder to which hydraulic wheel brakes are connected. The master brake cylinder has an electromechanical brake booster. The latter comprises an electric motor which actuates the master brake cylinder by means of a rotational/translational change-speed gear mechanism.

The previously known brake booster has a spindle drive as a rotational/translational change-speed gear mechanism. The disclosure is not restricted to this type of gear mechanism. The brake booster applies a booster force to a piston of the master brake cylinder in addition to a muscle force, in order to actuate the master brake cylinder. The brake booster can be controlled, for example, with an electronic control device.

The wheel brakes are connected to the master brake cylinder with the intermediate connection of a wheel slip control device. The wheel slip control device permits in a manner known per se, for example, a (brake) anti-lock control process, a traction control system and/or a vehicle dynamics control system. The abbreviations ABS, TCS, VDCS and ESP are customary for these control processes. The wheel slip control device has wheel brake pressure modulation valve arrangements and one hydraulic pump per brake circuit, with which hydraulic pumps hydraulic wheel brake pressures can be controlled/modulated on a wheel-specific basis in the wheel brakes. The hydraulic motor of a wheel slip control device is often referred to as a feedback pump. It can be used to generate a wheel brake pressure even when the master brake cylinder is not actuated.

SUMMARY

The disclosure provides for the hydraulic vehicle brake system to be actuated with the brake booster which actuates the master brake cylinder, and at the same time the wheel slip control device, in particular with the hydraulic pump thereof. A very rapid, highly dynamic build-up of pressure in the wheel brakes is possible through the interaction of the brake booster which actuates the master brake cylinder, and by means of the wheel slip control device, for example the hydraulic pump thereof. The actuation of the master brake cylinder with the brake booster generates a hydraulic pressure in the vehicle brake system which is available as a wheel brake pressure to the wheel brakes. In addition, the hydraulic pressure which the brake booster generates by actuating the master brake cylinder is available on the suction side of the hydraulic pump, and the latter does not have to suck in any pressureless brake fluid but rather the master brake cylinder supplies it with pressurized brake fluid. The build-up of brake pressure with the hydraulic pump is considerably speeded up by this. The actuation of the master brake cylinder with the brake booster therefore not only involves the direct actuation of the wheel brakes but also has the additional advantage that it speeds up the build-up of pressure with the hydraulic pump.

The method according to the disclosure is provided for safety functions and assistance functions of a hydraulic vehicle brake system in which high dynamics of the pressure build-up, i.e. a rapid build-up of wheel brake pressure, is required or at any rate advantageous. However, the disclosure is not restricted to such functions.

The disclosure provides an electromechanical brake booster as a controllable brake booster. The above-mentioned laid-open patent application DE 103 27 553 A1 discloses such a brake booster. Electromechanical brake boosters are also known with an electric linear motor or an electromagnet. In this regard, reference is made for example to the laid-open patent application DE 100 57 557 A1. For design reasons, electromechanical brake boosters can be controlled electrically or electronically and are therefore suitable for use in the method according to the disclosure. Basically any controllable brake booster can be used to carry out the method according to the disclosure. A partial vacuum brake booster has, to improve its controllability, for example a controllable (solenoid) valve for ventilating a working chamber in addition to a servo valve which is present and which ventilates the working chamber as a function of the travel of a piston rod and/or of a muscle force which is applied to it. Other pneumatic brake boosters or electro-hydraulic brake boosters with, for example, an electric motor or a hydraulic motor and a hydraulic pump driven by the motor, if appropriate a downstream hydraulic accumulator and a control valve arrangement or else piezo-electrically actuated brake boosters can also be used for the disclosure. The enumeration is not exhaustive.

The disclosure provides for the inventive actuation of the hydraulic vehicle brake system simultaneously by actuating the master brake cylinder with the brake booster and by generating pressure with (the hydraulic pump of) the wheel slip control device if a wheel brake pressure is to be generated which is greater than a predefined or predefinable threshold value. The disclosure also provides the same for a predefined or predefinable threshold value of a speed for the building up of the wheel brake pressure. Both possibilities can be carried out individually or in combination. The subject matter of the two possibilities is to reduce a wheel brake pressure within a short time or to quickly build up pressure.

A further application of the disclosure is to increase the wheel brake pressure in the at least one wheel brake to a pressure which is higher than the pressure which can be achieved by actuating the master brake cylinder with the brake booster. For this purpose, the disclosure provides for the master brake cylinder to be actuated with the brake booster and for the pressure which is generated thereby to be increased with the wheel slip control device, in particular with the hydraulic pump thereof. The generation of pressure with the wheel slip control device can occur at the same time as the actuation of the master brake cylinder by means of the brake booster. It is also possible that a pressure which is initially generated by actuating the master brake cylinder with the brake booster is increased with the wheel slip control device, in particular by switching on the hydraulic pump thereof, or that conversely the pressure level which is initially generated with the wheel slip control device is raised by actuating the master brake cylinder with the brake booster. The same wheel brake pressure can prevail in all the vehicle wheels, and likewise a wheel-specific control of the brake pressure is possible in a known and customary fashion in all the vehicle wheels with the wheel slip control device. Apart from the advantage that a higher pressure can be achieved than by actuating the master brake cylinder with the brake booster, this refinement of the disclosure has the advantage that brakes can be actuated exclusively by actuating the master brake cylinder with the brake booster insofar as the pressure which can be generated or is generated thereby is sufficient. The actuation of the brakes of the vehicle brake system with the brake booster is, in contrast to actuation of the brakes with the hydraulic pump of a wheel slip control device, virtually imperceptible to a driver of a vehicle. If the pressure which is generated with the brake booster is not sufficient, the increase in pressure according to the disclosure is carried out with the wheel slip control device. The increasing pressure takes place very quickly because of the hydraulic pressure which is increased on the suction side of the hydraulic pump.

In particular, if the master brake cylinder is not actuated with muscle force, a high wheel brake pressure can be generated quickly with the method according to the disclosure. A rapid build-up of pressure is necessary or at any rate advantageous during a vehicle dynamics control process, that is to say the targeted braking of one or more vehicle wheels in order to counteract the tendency of a vehicle to skid. The tendency to skid can occur without a driver of a vehicle actuating the brake, that is to say without actuation by muscle force.

The method according to the disclosure can also be used advantageously to avoid an accident or in the event of an accident. An accident is detected with what is referred to as a "crash sensor" which is often present in any case for triggering airbags. An imminent impact against an obstacle can be detected with one or more radar sensors and the vehicle brake system can be actuated according to the disclosure. Such an obstacle can also be a vehicle which is travelling ahead or a vehicle which has already come to a standstill. A further application possibility of the method according to the disclosure is the avoidance of the rolling over of the vehicle, also referred to in English as "roll-over mitigation" (ROM). Such methods are used mainly in high vehicles such as vans, SUVs (sport utility vehicles) or off-road vehicles. If the vehicle begins to tilt at high speed, one or more vehicle wheels are made to lock by sudden braking. The lateral guidance forces of the locking wheels, and as a result the tendency of the vehicle to tilt, are reduced. All the specified application cases have in common the fact that they are more effective the earlier they start and the quicker they become effective, and a rapid build-up of wheel brake pressure is necessary or at any rate advantageous. The build-up of the high wheel brake pressure is indispensable for these applications in order to brake one or more vehicle wheels until they lock.

It is also possible to use the brake booster to generate or maintain a hydraulic pressure on a master brake cylinder side of the isolating valve or valves. The isolating valve is closed when the master brake cylinder is actuated with the brake booster or the isolating valve is closed when the master brake cylinder is not actuated, and the master brake cylinder is subsequently actuated with the brake booster and as a result the pressure is generated on the master brake cylinder side of the isolating valve. The pressure which is generated on the master brake cylinder side of the isolating valve by actuating the master brake cylinder with the brake booster may be the same size or larger or smaller than a pressure on the wheel brake side of the isolating valve. The wheel slip control device can be used to lower or else increase the wheel brake pressure in all the wheel brakes or on a wheel-specific basis with respect to the master brake cylinder pressure. This refinement of the disclosure produces leakage through the isolating valves, that is to say produces a flow of brake fluid in the direction of the master brake cylinder or in the direction of the wheel brakes through the closed isolating valve when there is a difference in pressure between the connections of the isolating valve. Cheaper isolating valves can also be used and the switching performance is smaller. The isolating valves can also be switched when there is a relatively small difference in pressure between their connections. A loss in pressure through the closed isolating valves is possible at most up to the main brake cylinder pressure which is generated and maintained by actuating the master brake cylinder with the brake booster.

BRIEF DESCRIPTION OF THE DRAWING

The disclosure will be explained in more detail below with reference to the drawing.

The single FIGURE shows a circuit diagram of a hydraulic vehicle brake system in order to explain the method according to the disclosure.

DETAILED DESCRIPTION

The hydraulic vehicle brake system 1 according to the disclosure which is illustrated in the drawing is embodied as a dual-circuit brake system with two brake circuits I, II which are connected to a master brake cylinder 2. Each brake circuit I, II is connected to the master brake cylinder 2 via an isolating valve 3. The isolating valves 3 are open 2/2-way solenoid valves in their de-energized basic position. A non-return valve 5, through which there can be a flow from the master brake cylinder 2 to wheel brakes 4, is respectively connected hydraulically in parallel with each of the isolating valves 3. Wheel brakes 4 are connected to the isolating valve 3 of each brake circuit I, II via brake pressure build-up valves 6. The brake pressure build-up valves 6 are open 2/2-way solenoid valves in their de-energized basic position. Non-return valves 7, through which there can be a flow from the wheel brakes 4 in the direction of the master brake cylinder 2, are connected in parallel with them.

A brake pressure reducing valve 8 is connected to each wheel brake 4, which brake pressure reducing valves 8 are connected together to a suction side of a hydraulic pump 9, which is also referred to as a feedback pump. The brake pressure reducing valves 8 are embodied as 2/2-way solenoid valves which are closed in their de-energized basic position. A pressure side of the hydraulic pump 9 is connected between the brake pressure build-up valves 6 and the isolating valves 3, i.e. the pressure side of the hydraulic pump 9 is connected to the wheel brakes 4 via the brake pressure build-up valves 6, and to the master brake cylinder 2 via the isolating valve 3. The brake pressure build-up valves 6 and the brake pressure reducing valves 8 are proportional valves because of the better possibility of open-loop and closed-loop control.

Each of the two brake circuits I, II has a hydraulic pump 9 which can be driven jointly with an electric motor 10. The suction sides of the hydraulic pumps 9 are connected to the brake pressure reducing valves 8. Hydraulic accumulators 11 for absorbing and buffering brake fluid are present on the suction side of the hydraulic pumps 9, said brake fluid flowing out of the wheel brakes 4 by opening the brake pressure reducing valves 8 during slip control.

The brake pressure build-up valves 6 and the brake pressure reducing valves 8 form wheel brake pressure modulation valve arrangements with which a wheel-specific brake pressure control process for slip control is possible in a manner known per se (which will not be explained here) when the hydraulic pump 9 is driven. The isolating valves 3 can be closed during a slip control process, i.e. the vehicle brake system 1 is hydraulically separated from the master brake cylinder 2.

For a rapid build-up of pressure when the master brake cylinder 2 is not actuated, the vehicle brake system 1 has an intake valve 19 in each brake circuit I, II, through which intake valve 19 the suction side of the hydraulic pump 9 can be connected to the master brake cylinder 2. The intake valves 19 are embodied as closed 2/2-way solenoid valves in their de-energized basic position.

The brake pressure build-up valves 6, the brake pressure reducing valves 8, the isolating valves 3, the intake valves 19 and the hydraulic pumps 9, which can be driven with the electric motor 10, are a component of a wheel slip control device 12 (anti-lock brake system ABS, traction control system TCS, vehicle dynamics control system VDCS, ESP) of the vehicle brake system 1. A wheel brake pressure can be generated in the wheel brakes 4 with the wheel slip control device 12, i.e. with the hydraulic pumps 9 thereof, even when the master brake cylinder 2 is not actuated, and can be controlled on a wheel-specific basis with the brake pressure build-up valves 6 and the brake pressure reducing valves 8.

The master brake cylinder has a brake booster 13, in the exemplary embodiment an electromechanical brake booster 13, which generates a booster force using an electric motor 14, which booster force actuates, together with a muscle force applied via a brake pedal 15, the master brake cylinder 2. The symbolically represented electric motor 14 is integrated into the brake booster 13. The electric motor 14 may be a rotational motor whose rotational movement is stepped down by means of a gear mechanism and converted into a translatory movement for actuating the master brake cylinder 2. The brake booster 13 can also be embodied with an electric linear motor or an electromagnet. The enumeration is not exhaustive. An electromechanical brake booster 13 is also not compulsory for the disclosure, and other brake boosters which can be controlled with an electric control device 16 are also possible. In order to perform open-loop or closed-loop control of the vehicle brake system 1, including that of the brake booster 13, the electronic control device 16 is provided.

In order to actuate the vehicle brake system 1, according to the disclosure the master brake cylinder 2 is actuated with the brake booster 13 and the hydraulic pumps 9 are driven with the electric motor 10. Both actuation of the master brake cylinder 2 and the driving of the hydraulic pumps 9 generate a hydraulic pressure in the vehicle brake system 1, which is used as a wheel brake pressure to actuate the wheel brakes 4. The intake valves 19 can be opened in this context.

The generation of pressure both with the master brake cylinder 2 and with the hydraulic pumps 9 brings about a rapid build-up of pressure. The build-up of pressure with the hydraulic pumps 9 is additionally speeded up by the actuation of the master brake cylinder 2 because the hydraulic pumps 9 do not have to suck in unpressurized brake fluid but instead are supplied with pressurized brake fluid. The application of the method according to the disclosure is particularly advantageous in situations in which the master brake cylinder 2 is not actuated by muscle force with the brake pedal 15 because in this case a build-up of pressure only with the hydraulic pumps 9 without actuating the master brake cylinder would be considerably slower.

The master brake cylinder 2 is actuated with the brake booster 13 at the same time as the hydraulic pumps 9 generate pressure if, for example, a high wheel brake pressure is required in the wheel brakes 4 and/or a rapid build-up of pressure is required. Both of these can be predefined by threshold values for the wheel brake pressure which is to be built up or for the pressure build-up speed. Further application cases for the method according to the disclosure, that is to say the simultaneous actuation of the master brake cylinder 2 with the brake booster 13 and the build-up of pressure with the hydraulic pumps 9, are an accident, the avoidance of an accident or at least the reduction in an impact speed in the event of an accident and the avoidance of rolling over of a vehicle. An accident is detected with what is referred to as a crash sensor such as is known for triggering air bags and is often present in vehicles. An imminent accident is detected, for example, with radar sensors. The risk of rolling over of a vehicle can be detected by means of a high tilting speed of the vehicle. Vehicle wheels can be selectively braked until they lock, in order to reduce their lateral guidance force, which counteracts the tendency to tilt.

In order to increase the wheel brake pressure in the wheel brakes 4 above the pressure which can be generated by actuating the master brake cylinder 2 with the brake booster 13, the master brake cylinder 2 is actuated with the brake booster 13, the isolating valves 3 are closed and the hydraulic pumps 9 are driven with the electric motor 10. The intake valves 19 are preferably opened, with the result that the hydraulic pumps 9 receive pressurized brake fluid from the master brake cylinder 2, which is actuated by the brake booster 13. When the intake valves 19 are closed, brake fluid must be contained in the hydraulic accumulators 11 on the suction sides of the hydraulic pumps 9, or at least one brake pressure reduction valve 8 must be opened in each brake circuit I, II so that the hydraulic pump 9 can suck in brake fluid and deliver it. The hydraulic pumps 9 can be switched on at the same time as the actuation of the master brake cylinder 2 with the brake booster 13 or the master brake cylinder 2 can firstly be actuated with the brake booster 13 and the hydraulic pumps 9 then switched on, or conversely the hydraulic pumps 9 can firstly be switched on and then the master brake cylinder 2 actuated with the brake booster 13. For example comfort braking is possible by actuating the master brake cylinder 2 with the brake booster 13. If, when the master brake cylinder 2 is actuated, a higher brake pressure is required than can be generated with the brake booster 13, the hydraulic pumps 9 are switched on and the isolating valves 3 are closed. Since the actuation of the brakes by actuating the master brake cylinder 2 with the brake booster 13 is, in contrast to actuation of the brakes with the hydraulic pumps 9 of the wheel slip control device 12, virtually imperceptible to a driver of a vehicle, the actuation of the brakes by actuating the master brake cylinder 2 with the brake booster 13 when the hydraulic pumps 9 are switched off can be referred to as comfort braking.

In order to maintain a specific wheel brake pressure, the isolating valves 3 are closed when the master brake cylinder 2 is actuated with the brake booster 13. The master brake cylinder 2 may also be actuated only after the closing of the isolating valves 3 if, for example, a wheel brake pressure has been built up or will be built up with the hydraulic pumps 9. The pressure which is generated with the master brake cylinder 2 actuated reduces leakage through the closed isolating valves 3 if the latter are not absolutely sealed. In this way, it is possible to maintain pressure without the hydraulic pumps 9. The pressure can be reduced below the master brake cylinder pressure by opening the brake pressure reducing valves 8, that is to say in a manner known per se with the wheel slip control device 12. Pressure can be increased with the hydraulic pumps 9. Wheel-specific control of the brake pressure with the wheel slip control device 12 is possible.

The invention claimed is:

1. A method for actuating a hydraulic vehicle brake system having (i) a hydraulic master brake cylinder, to which at least one hydraulic wheel brake is connected, (ii) a controllable brake booster, and (iii) a wheel slip control device including a hydraulic pump configured to generate a wheel brake pressure in the at least one wheel brake, the method comprising:

opening an intake valve, which hydraulically connects the brake booster to a suction side of the hydraulic pump;

actuating the master brake cylinder with the brake booster in order to provide an increased pressure to the suction side of the hydraulic pump and actuate the at least one hydraulic wheel brake without actuation of the master brake cylinder by muscle force; and operating the hydraulic pump simultaneously with the actuation of the master brake cylinder with the brake booster without actuation of the brake master cylinder by muscle force to generate the wheel brake pressure in the at least one wheel brake.

2. The method as claimed in claim 1, wherein the controllable brake booster includes an electromechanical brake booster.

3. The method as claimed in claim 1, wherein the opening of the intake valve, the actuation of the master brake cylinder with the brake booster, and the operation of the hydraulic pump are performed in response to a target wheel brake pressure to be generated being greater than a threshold value.

4. The method as claimed in claim 1, wherein the opening of the intake valve, the actuation of the master brake cylinder with the brake booster, and the operation of the hydraulic pump are performed in response to a speed at which the wheel brake pressure is to be generated being greater than a threshold value.

5. The method as claimed in claim 1, wherein in order to actuate the brakes, the wheel brake pressure is increased with the hydraulic pump above a pressure which can be generated by actuating the master brake cylinder with the brake booster alone.

6. The method as claimed in claim 1, further comprising:
closing an isolating valve, which hydraulically connects the at least one wheel brake to the master brake cylinder and which is arranged between the master brake cylinder and a pressure side of the hydraulic pump, after a first pressure is generated by actuating the master brake cylinder with the brake booster.

7. The method as claimed in claim 1, wherein the opening of the intake valve, the actuation of the master brake cylinder with the brake booster, and the operation of the hydraulic pump are performed in response to an accident.

8. A method for actuating a hydraulic vehicle brake system having (i) a hydraulic master brake cylinder, to which at least one hydraulic wheel brake is connected, (ii) a controllable brake booster, and (iii) a wheel slip control device including a hydraulic pump configured to generate a wheel brake pressure in the at least one wheel brake, the method comprising:

opening an intake valve, which hydraulically connects the brake booster to a suction side of the hydraulic pump;

opening an isolating valve hydraulically connecting the brake booster to the at least one hydraulic wheel brake;

actuating the master brake cylinder with the brake booster to actuate the at least one hydraulic wheel brake without actuation of the master brake cylinder by muscle force while the intake and isolating valves are open; and operating the hydraulic pump simultaneously with the actuation of the master brake cylinder with the brake booster without actuation of the brake master cylinder by muscle force to generate the wheel brake pressure in the at least one wheel brake.

* * * * *